United States Patent
Lempel

[19]

[11] Patent Number: 6,163,576

[45] Date of Patent: Dec. 19, 2000

[54] VIDEO ENCODER HAVING REDUCED MEMORY BANDWIDTH REQUIREMENTS

[75] Inventor: Mody Lempel, Sunnyvale, Calif.

[73] Assignee: LSI Logic Corporation, Milpitas, Calif.

[21] Appl. No.: 09/059,247

[22] Filed: Apr. 13, 1998

[51] Int. Cl.[7] ....................................................... H04N 7/12

[52] U.S. Cl. ....................................................... 375/240.24

[58] Field of Search ..................................... 348/394, 401, 348/400, 407, 409, 413, 416, 699; 375/240.24, 240.01; H04N 7/12

[56] References Cited

U.S. PATENT DOCUMENTS

| | | | |
|---|---|---|---|
| 5,530,481 | 6/1996 | De With et al. | 348/415 |
| 5,864,681 | 1/1999 | Proctor et al. | 382/232 |

*Primary Examiner*—Young Lee

[57] ABSTRACT

A video encoder typically includes a preprocessor, a frame store, a motion compensator, and a compression module. The preprocessor converts an incoming digital video signal to image macroblocks. The frame store stores the macroblocks from anchor frames, and the motion compensator searches neighborhoods in anchor frames for best matches to macroblocks from a current frame. The compression module receives a vector from the motion compensator indicative of the best match and uses it to compress the macroblocks from the current frame. The compressed macroblocks are provided as components of a compressed video output bitstream. To perform the neighborhood search, the motion compensator accesses many neighborhood macroblocks from the anchor frame for each macroblock from the current frame. To reduce the number of memory accesses, the motion compensator caches the neighborhood macroblocks. Since the search neighborhoods for adjacent macroblocks overlap, caching is effective. The effectiveness of caching may be increased by altering the order in which macroblocks from the current anchor frame are processed. This advantageously reduces the number of neighbourhood macroblocks from the anchor frame added to the cache for each neighborhood search, thereby providing for reduced requirement for memory bandwidth of the frame store.

19 Claims, 6 Drawing Sheets

VIDEO ENCODER HAVING REDUCED MEMORY BANDWIDTH REQUIREMENTS

BACKGROUND OF THE INVENTION

1. Field of the Invention

This invention generally relates to the field of digital video compression, and more particularly to a digital video encoder with reduced memory bandwidth requirements.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e. if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield very high compression ratios.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I (intra) frames contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame. For a target B frame, the encoder searches in a prior and subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering, the coefficient sequence is often organized in a specified orientation termed zigzag ordering. Zigzag ordering concentrates the highest spatial frequencies at the end of the series. Once the zigzag ordering has been performed, the encoder performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, run-length coding results in additional video compression.

The video encoder then performs variable-length coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

The final compressed video data is then ready to be transmitted to a storage device or over a transmission medium for reception and decompression by a remotely located decoder. Because of the picture dependencies, i.e., the temporal compression, the order in which the frames are transmitted, stored, or retrieved, is not necessarily the display order, but rather an order required by the decoder to properly decode the pictures in the bitstream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame must be transmitted and decoded before the dependent B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zigzag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames must be decoded and available in a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As noted above, the frames may also need to be re-ordered before they are displayed in accordance with their display order instead of their coding order. After the frames are re-ordered, they may then be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display processor retrieves the picture data for display by an appropriate display device, such as a TV monitor or the like.

The memory is a major cost item in the production of video encoders, and generally memories with higher bandwidths cost more. Thus, it is desirable to reduce the memory bandwidth requirements of the encoder system as much as possible to either reduce the cost or allow for increased performance.

SUMMARY OF THE INVENTION

Accordingly, there is provided herein a video encoder with reduced memory bandwidth requirements. In one embodiment, the video encoder includes a preprocessor, a frame store, a motion compensator, and a compression module. The preprocessor converts an incoming digital video signal to image macroblocks. The frame store stores the macroblocks from anchor frames, and the motion compensator searches neighborhoods in anchor frames for best matches to macroblocks from a current frame. The compression module receives a vector from the motion compensator indicative of the best match and uses it to compress the macroblocks from the current frame. The compressed macroblocks are provided as components of a compressed video output bitstream.

To perform the neighborhood search, the motion compensator accesses many neighborhood macroblocks from the anchor frame for each macroblock from the current frame. To reduce the number of memory accesses, the motion compensator caches the neighborhood macroblocks. Since the search neighborhoods for adjacent macroblocks overlap, caching is effective. In one embodiment, the effectiveness of caching is increased by altering the order in which macroblocks from the current frame are processed. This advantageously reduces the number of neighborhood macroblocks from the anchor frame added to the cache for each neighborhood search. This results in reduced memory bandwidth requirements for the frame store.

BRIEF DESCRIPTION OF THE DRAWINGS

Other objects and advantages of the invention will become apparent upon reading the following detailed description and upon reference to the accompanying drawings in which.

Figure 1:
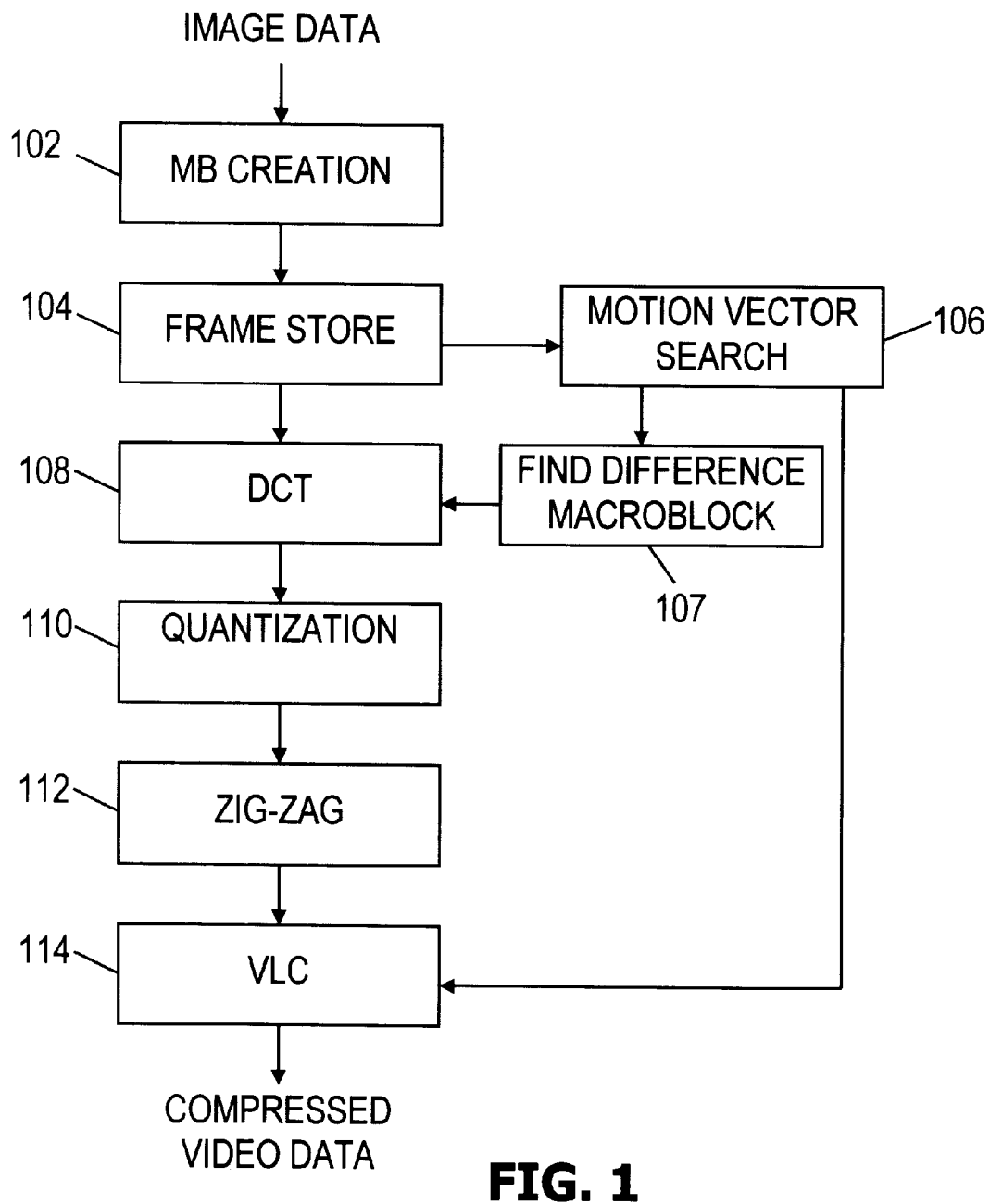
FIG. 1 is a signal flow diagram of the MPEG video encoding process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a signal flow diagram illustrating the MPEG video encoding process. The signal flow diagram comprises macroblock creation module 102, frame store 104, motion vector search module 106, macroblock difference module 107, discrete-cosine transform (DCT) module 108, quantization module 110, zigzag module 112, and variable-length coding (VLC) module 114. Digital image data is provided to macroblock creation module 102 in raster order. Macroblock creation module 102 converts the digital image data into macroblocks and stores the macroblocks in frame store 104. For B-frames and P-frames, motion vector search module 106 determines for each macroblock a vector from the location of that macroblock to a best-matching region in an anchor frame. These vectors are provided to VLC module 114, as will be discussed further below. For B-frames and P-frames, macroblock difference module 107 determines the difference between the macroblock and the best matching region and provide the difference macroblock to DCT module 108. DCT module 108 performs a discrete cosine transform for each macroblock (for I-frames) or difference macroblock (for B-frames and P-frames) and provides the discrete cosine transform coefficients to quantization module 110. Quantization module 110 truncates bits from the discrete cosine transform coefficients in an optimized fashion. Zigzag module 112 re-orders the quantized coefficients, and VLC module 114 run length encodes and Huffman encodes the re-ordered coefficients. VLC module 114 also Huffman encodes the motion vectors from motion vector search module 106 to produce a fully encoded macroblock. VLC module 114 provides these fully encoded macroblocks in the form of a compressed video data stream.

Figure 2:
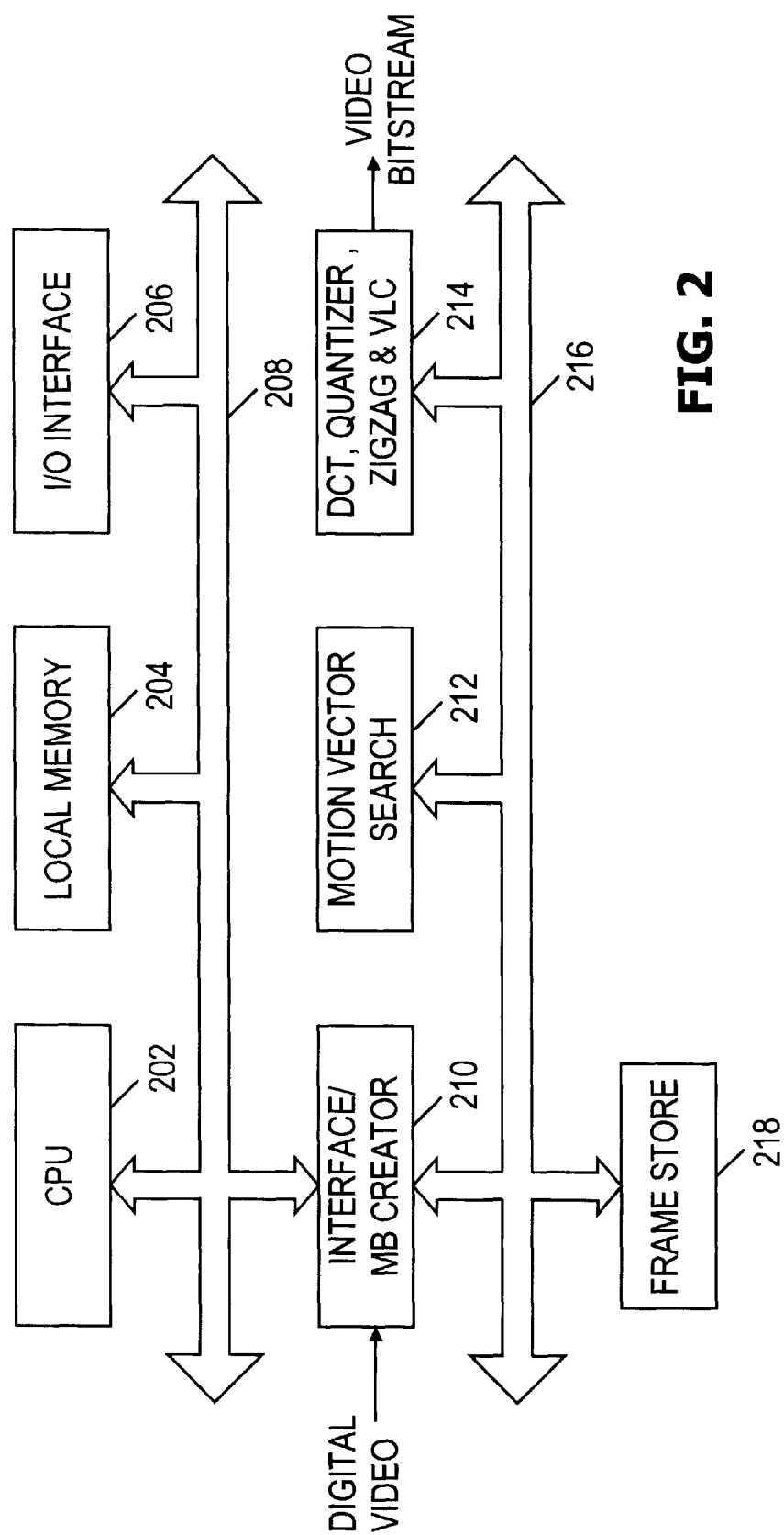
FIG. 2 is a block diagram of an illustrative video encoder.

FIG. 2 shows a block diagram of an illustrative video encoder comprising CPU 202, local memory 204, I/O interface 206, local bus 208, preprocessor 210, motion compensator 212, compression module 214, video bus 216, and frame store 218. CPU 202 operates to control and modify the operation of the video encoder in accordance with software stored in local memory 204 and user input via I/O interface 206. Local bus 208 couples these components together and to preprocessor 210.

Preprocessor 210 receives the digital video input signal, converts it into macroblocks, and writes the macroblocks to the frame store 218 via video bus 216. Preprocessor 210 also acts as an interface between the local bus 206, motion compensator 212 and compression module 214, passing on operating parameters it receives from the CPU 202 and notifying CPU 202 of events in the encoder modules 210, 212, 214.

Motion compensator 212 processes incoming macroblocks and macroblocks of anchor frames to determine motion vectors for the incoming macroblocks. Motion compensator 212 would ordinarily include a cache memory for reducing loading on video bus 216.

Compression module 214 compresses the incoming macroblocks using the motion vector and the portion of the anchor frame to which the motion vector refers, and using the DCT, quantization, zigzag reordering, and VLC coding described previously. The compressed video bitstream output is provided by compression module 214.

Frame store 218 is used to buffer incoming video data and to hold the anchor frames for access by motion compensator 212 and compression module 214. Video bus 216 conveys macroblocks between frame store 218 and encoder modules 210, 212, and 214.

During the encoding process, the most expensive task (in terms of computation and memory bandwidth) is motion estimation. The computational burden can be addressed by increasing the processing speed and number of processing units performing the motion vector search of motion compensator 212. The limited memory bandwidth of frame store 218 then becomes a bottleneck limiting the performance of the video encoder.

Figure 3:
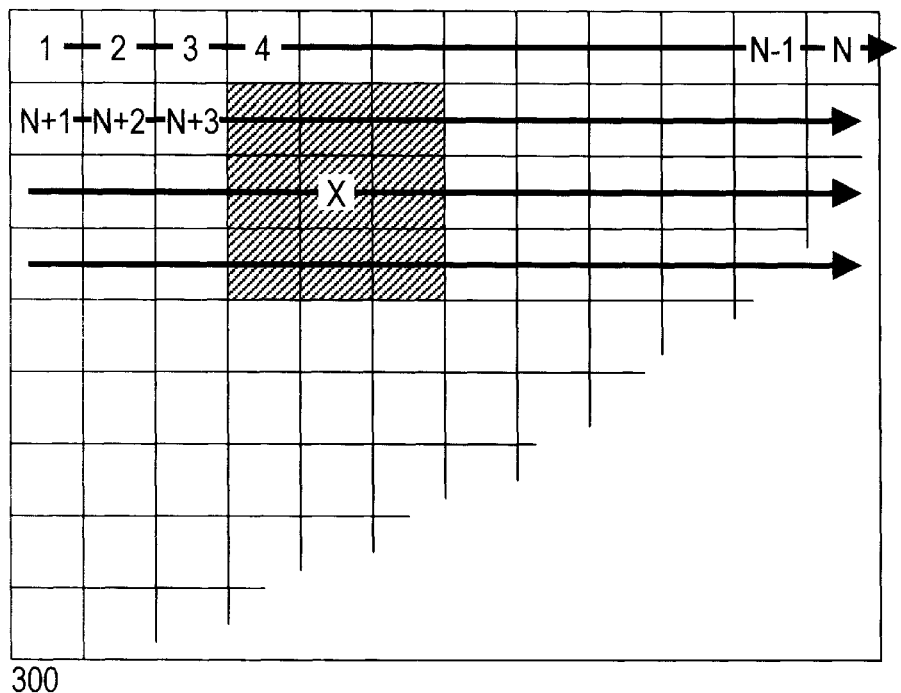
FIG. 3 illustrates one processing order of macroblocks in an image.

Turning now to FIG. 3 a typical macroblock processing order is illustrated. Image 300 is divided into 16×16 pixel macroblocks which are processed in raster order, i.e. from left to right, one row at a time. For a typical macroblock, say X, motion compensator 212 examines the anchor frame macroblocks in a (2M+1)×(2M+1) macroblock region surrounding the location of the macroblock for which a match is being sought. The neighborhood size M is a parameter chosen based on the searching capability of motion compensator 212 Generally, larger neighborhoods yield higher probabilities of finding a good match, which in turn leads to a higher compression. Neighborhood size M typically ranges from 1 to 5. FIG. 3 shows a neighborhood size M=1.

Figure 4:
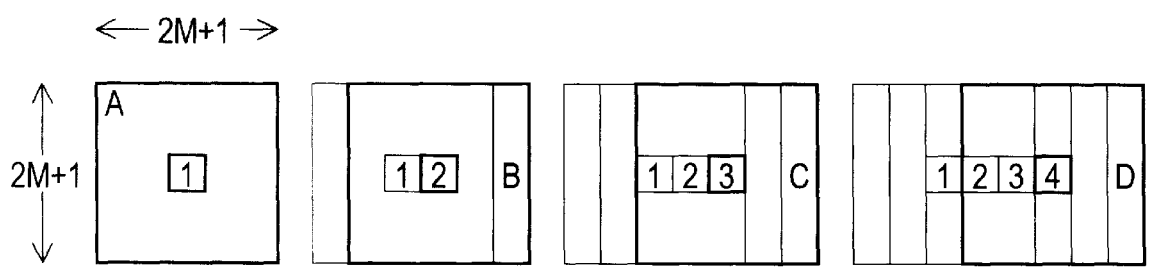
FIG. 4 illustrates the progression of macroblock neighborhoods when macroblocks are processed in the order illustrated in FIG. 3.

FIG. 4 shows the progression of neighborhoods when macroblocks are processed in raster order (assuming that M=2). It is noted that successive neighborhoods largely overlap previous neighborhoods. After the motion vector search for a given macroblock is completed, to perform the search for the next macroblock, motion compensator 212 only needs 2M+1 macroblocks which were not in the last neighborhood search. Consequently, if motion compensator 212 caches the macroblocks from the previous search, only 2M+1 macroblocks need to be retrieved from frame store 218 for each subsequent search. If 28,800 macroblocks are being compressed each second, frame store 218 must provide sufficient bandwidth for 28,800 macroblocks to be written by preprocessor 210, (2M+1)×28,800 macroblocks to be accessed by motion compensator 212, and 28,800 macroblocks to be read by compression module 214, all in one second. Each macroblock may require up to 512 bytes. Clearly, heavy demands are placed on frame store 218, and the bulk of the demand is imposed by motion compensator 212.

Figure 5:
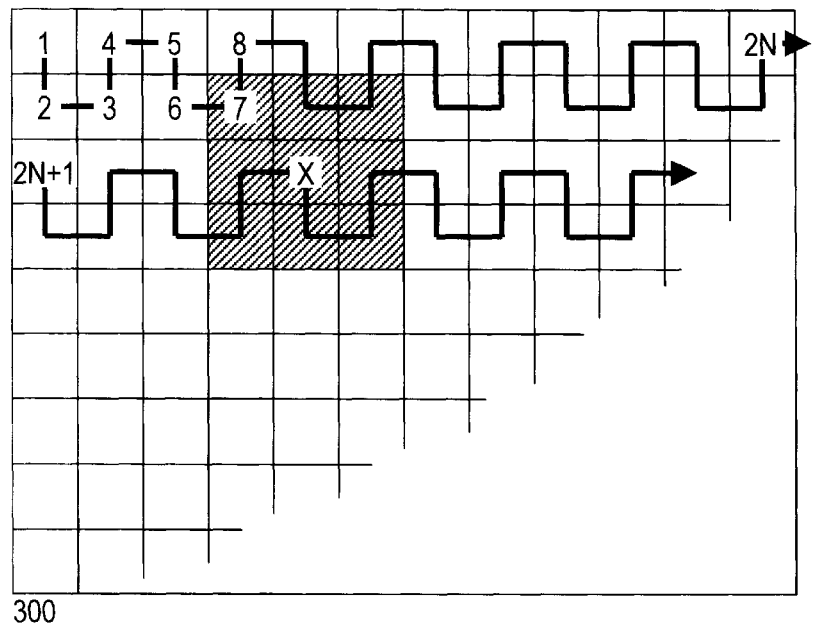
FIG. 5 illustrates an alternate processing order of macroblocks in an image.

FIG. 5 shows an alternate macroblock processing order, referred to herein as two-row encoding. Two rows at a time are encoded from left to right. Motion compensator 212 chooses the next macroblock to be encoded, alternately moving along, then between, the rows being encoded. The order in which the first eight macroblocks are processed is labeled in FIG. 5.

Figure 6:
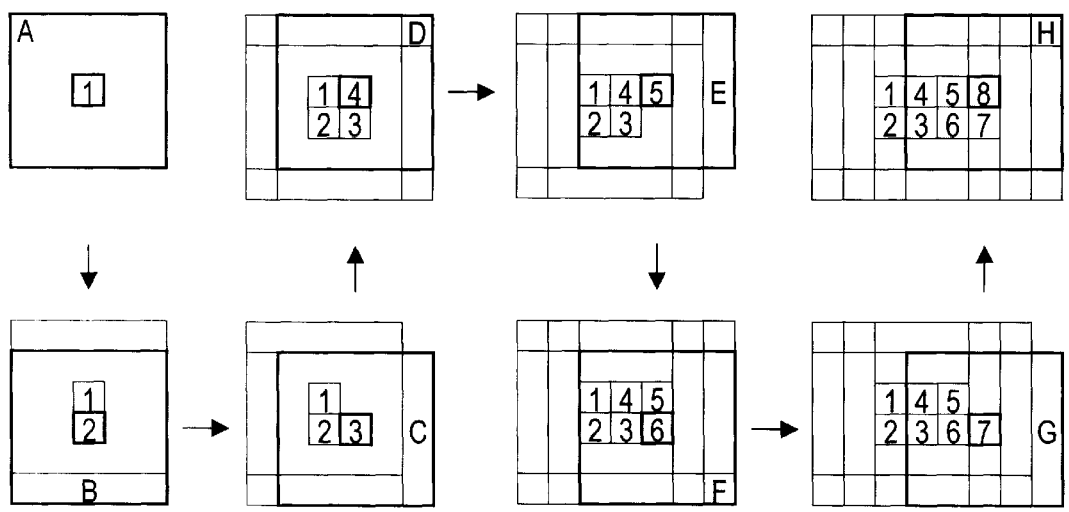
FIG. 6 illustrates the progression of macroblock neighborhoods when macroblocks are processed in the order illustrated in FIG. 5.

The progression of neighborhoods when macroblocks are processed in two-row encoding is shown in FIG. 6. Again, it is noted that successive neighborhoods largely overlap previous neighborhoods, but in this case the average degree of overlap is greater. Two directions of movement now occur. When motion compensator 212 starts a new column (i.e. encodes the next macroblock along the row), 2M+1 new macroblocks not in previous neighborhoods must be retrieved. This is shown by regions C, E, and G in FIG. 6. When motion compensator 212 moves between rows, only 1 new macroblock not in previous neighborhoods must be retrieved (except in the first column). This is shown by regions D, F, and H in FIG. 6. Consequently, when macroblocks from the previous three searches are cached, the average number of macroblocks which must be retrieved per search is (2M+2)/2, which is significantly less than 2M+1 for the raster order case.

Figure 7:
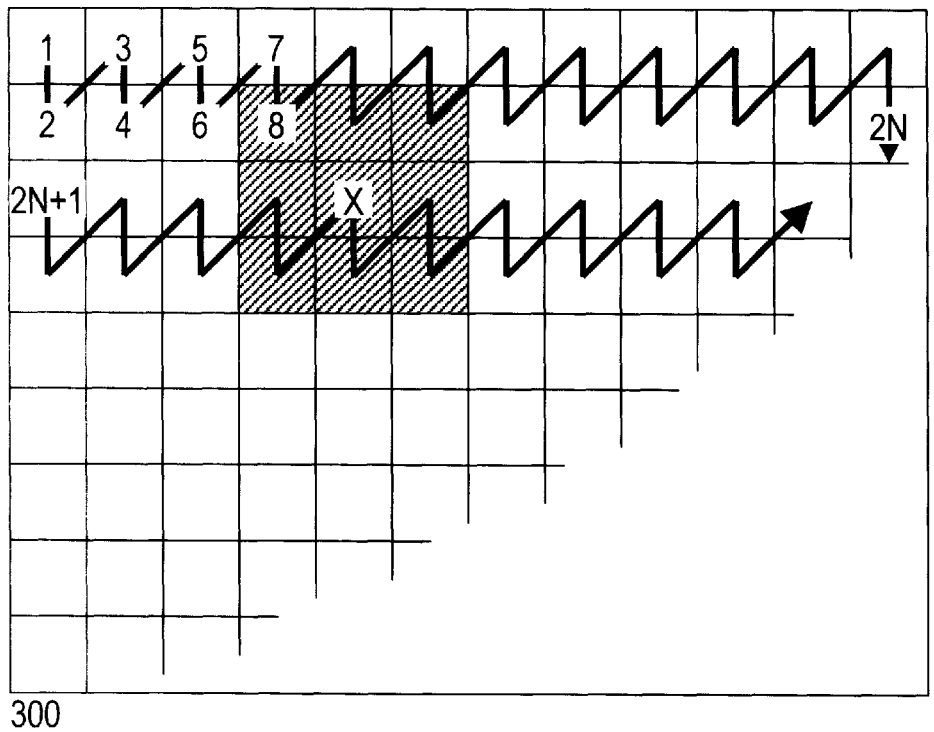
FIG. 7 illustrates another alternate processing order of macroblocks in an image.

It is noted that a variation on two-row encoding may be employed, as shown in FIG. 7. In this approach, macroblocks from the previous two searches are cached. As discussed further below, the minimum cache size still remains the same for this approach. It is also noted that the processing order can start at the bottom of the each column and move upward along each column before moving to the next column.

Figure 8:
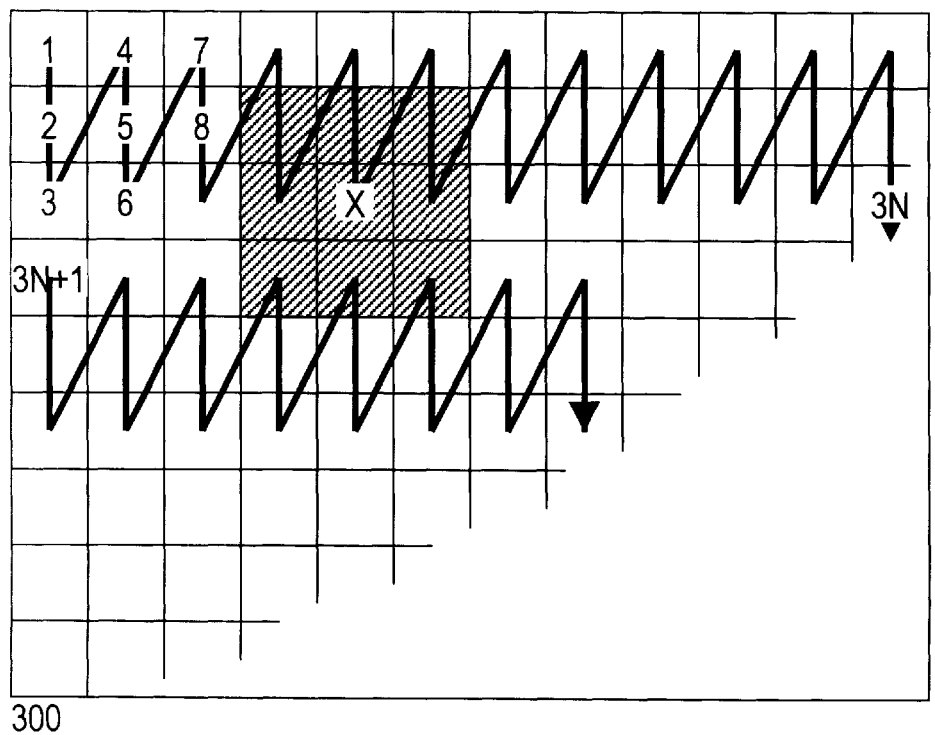
FIG. 8 illustrates yet another alternate processing order of macroblocks in an image.

It is noted that either of the two-row encoding variations may be extended to three-row encoding, as shown in FIG. 8, or four-row encoding, five-row encoding, and so on. As discussed further below, this increases the minimum cache size.

For L-row encoding, the average number of macroblocks which must be retrieved by motion compensator 212 for each search is (2M+L)/L, neglecting the macroblocks retrieved for the first column. This is seen by observing that the first macroblock in each column requires 2M+1 macroblocks to be retrieved, and every other macroblock in that column requires only 1 macroblock to be retrieved.

Although compression module 214 can compress each macroblock as motion compensator 212 finds a motion compensation vector for it, the compressed macroblocks can only be written out in raster order. Consequently, all compressed macroblocks on rows after the first row must be temporarily stored until after the first row has been completely encoded. Alternatively, the motion vectors can be stored with the uncompressed macroblocks, but this would require a significantly larger memory.

Assuming that the compressed macroblocks are temporarily stored in (i.e. written to and read from) frame store 218, and that compressed macroblocks are on average ⅙ the size of uncompressed macroblocks, then an additional burden of ⅓ macroblock is placed on frame store 218 by compression module 214 for each macroblock not on the first row. The average additional burden per macroblock is then (L−1)/3L. For L-row encoding, the total number of macroblock accesses per macroblock search is then:

$$\frac{2M+L}{L} + \frac{L-1}{3L} = \frac{6M+4L-1}{3L}$$

Figure 9:
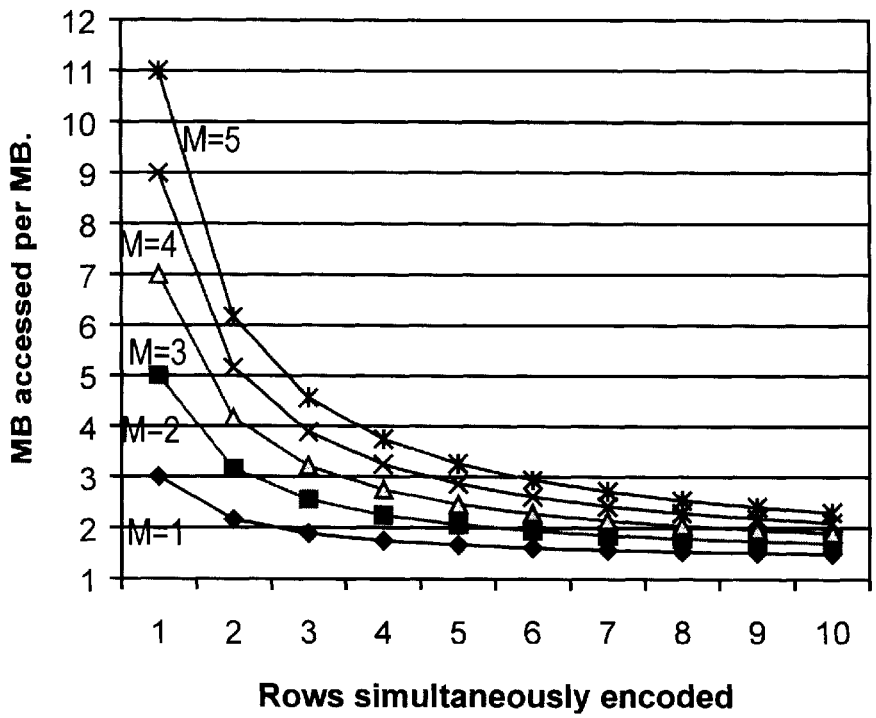
FIG. 9 is a chart showing the number of macroblock accesses in the frame store as a function of the number of rows simultaneously encoded.

This value is shown for various values of M and L in FIG. 9. Note in particular that a frame store able to support the 3 macroblocks per search requirements for neighborhood size M=1 in one-row encoding (raster order) is able to support neighborhood sizes M=2, 3, 4, and 5 if three, four, five, and six row encoding is used, respectively. Also, a frame store able to support the 7 macroblocks per search requirements for neighborhood size M=3 in one-row encoding is able to support neighborhood size M=5 if two-row encoding is used.

Figure 10:
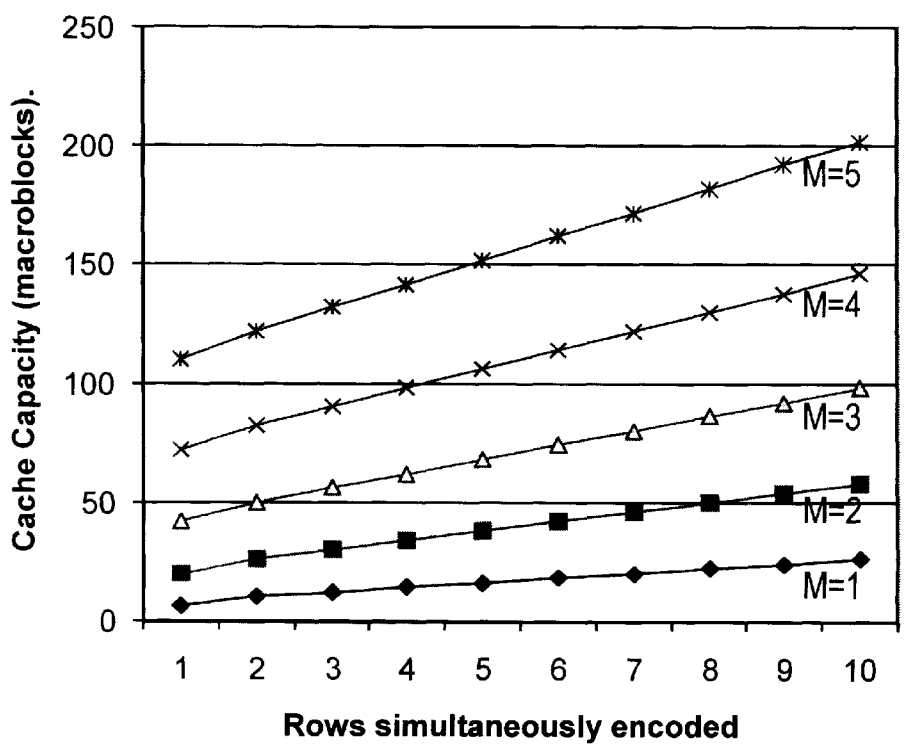
FIG. 10 is a chart showing the required cache capacity as a function of the number of rows simultaneously encoded.

The trade-off for reducing the memory bandwidth requirements is an increased cache size. For one-row encoding (raster order) the cache must hold 2M(2M+1) macroblocks. For L-row encoding, a cache capacity of no more than 2M(2M+L)+2 macroblocks is required. FIG. 10 shows a chart of cache capacities that are required for various values of M and L. The cache capacities increase linearly with the number of rows encoded at a time, at a slope of 2, 4, 6, 8, and 10 additional macroblocks per line for neighborhood sizes M=1, 2, 3, 4, 5, respectively. Increasing the number of rows simultaneously encoded may consequently be seen as a method for reducing memory bandwidth requirements for a given neighborhood size.

Numerous variations and modifications will become apparent to those skilled in the art once the above disclosure is fully appreciated. It is intended that the following claims be interpreted to embrace all such variations and modifications.

What is claimed is:

1. A method for video compression, wherein the method comprises:

receiving a sequence of target macroblocks to be encoded relative to an anchor frame; and processing the sequence of target macroblocks in a predetermined order, wherein the processing includes performing a neighborhood search for each target macroblock in the sequence, wherein the predetermined order is such that the neighborhood search for at least two target macroblocks in a column is performed before the neighborhood searches for any target macroblocks in the next column; and caching anchor frame macroblocks from at least three previous neighborhood searches and retaining in the cache anchor frame macroblocks not used in a most recent neighborhood search.

2. A method for video compression, wherein the method comprises:

receiving a sequence of target macroblocks to be encoded relative to an anchor frame; and processing the sequence of target macroblocks in a predetermined order, wherein the processing includes performing a neighborhood search for each target macroblock in the sequence, wherein the predetermined order is such that the neighborhood search for at least two target macroblocks in a column is performed before the neighborhood searches for any target macroblocks in the next column, wherein the processing includes:

a search for a first target macroblock in a first row, followed by a search for a first target macroblock in a second row, followed by a search for a second target macroblock in the first row, followed by a search for a second target macroblock in the second row.

3. A method for video compression, wherein the method comprises:

receiving a sequence of target macroblocks to be encoded relative to an anchor frame; and processing the sequence of target macroblocks in a predetermined order, wherein the processing includes performing a neighborhood search for each target macroblock in the sequence, wherein the predetermined order is such that the neighborhood search for at least two target macroblocks in a column is performed before the neighborhood searches for any target macroblocks in the next column, wherein the processing includes:

a search for a first target macroblock in a first row, followed by a search for a first target macroblock in a second row, followed by a search for a second target macroblock in the second row, followed by a search for a second target macroblock in the first row.

4. A method for video compression, wherein the method comprises:

receiving a sequence of target macroblocks to be encoded relative to an anchor frame; and processing the sequence of target macroblocks in a predetermined order, wherein the processing includes performing a neighborhood search for each target macroblock in the sequence, wherein the predetermined order is such that the neighborhood search for at least two target macroblocks in a column is performed before the neighborhood searches for any target macroblocks in the next column, wherein the processing includes:

a search for a first target macroblock in a first row, followed by a search for a first target macroblock in a second row, followed by a search for a first target macroblock in a third row, followed by a search for a second target macroblock in the first row.

5. A method for video compression, wherein the method comprises:

receiving a sequence of target macroblocks to be encoded relative to an anchor frame; and processing the sequence of target macroblocks in a predetermined order, wherein the processing includes performing a neighborhood search for each target macroblock in the sequence, wherein the predetermined order is such that the neighborhood search for at least two target macroblocks in a column is performed before the neighborhood searches for any target macroblocks in the next column, wherein the processing includes:

a search for a first target macroblock in a first row, followed by a search for a first target macroblock in a second row, followed by a search for a first target macroblock in a third row, followed by a search for a first target macroblock in a fourth row, followed by a search for a second target macroblock in the first row.

6. A method for video compression, wherein the method comprises:

storing anchor macroblocks from an anchor frame in a frame store;

receiving target macroblocks from a current frame for encoding relative to the anchor frame;

retrieving neighborhood anchor macroblocks from the frame store for an instant target macroblock in an instant macroblock row of the current frame;

searching the neighborhood anchor macroblocks for a best match to the instant target macroblock;

generating a vector indicative of the best match to the instant target macroblock;

retrieving a single neighborhood anchor macroblock from the frame store for a subsequent target macroblock in an adjacent macroblock row of the current frame;

searching the neighborhood anchor macroblocks for a best match to the subsequent target macroblock; and generating a vector indicative of the best match to the subsequent target macroblock.

7. The method of claim 6, further comprising:

retrieving neighborhood anchor macroblocks from the frame store for a next target macroblock in the adjacent macroblock row of the current frame;

searching the neighborhood anchor macroblocks for a best match to the next target macroblock;

generating a vector indicative of the best match to the next target macroblock;

retrieving a single neighborhood anchor macroblock from the frame store for a following target macroblock in the instant macroblock row of the current frame;

searching the neighborhood anchor macroblocks for a best match to the following target macroblock; and generating a vector indicative of the best match to the following target macroblock.

8. The method of claim 6, further comprising:

retrieving neighborhood anchor macroblocks from the frame store for a next target macroblock in the instant macroblock row of the current frame;

searching the neighborhood anchor macroblocks for a best match to the next target macroblock;

generating a vector indicative of the best match to the next target macroblock;

retrieving a single neighborhood anchor macroblock from the frame store for a following target macroblock in the adjacent macroblock row of the current frame;

searching the neighborhood anchor macroblocks for a best match to the following target macroblock; and generating a vector indicative of the best match to the following target macroblock.

9. The method of claim 6, further comprising:

retrieving a single neighborhood anchor macroblock from the frame store for a next target macroblock in a subsequent macroblock row of the current frame;

searching the neighborhood anchor macroblocks for a best match to the next target macroblock; and generating a vector indicative of the best match to the next target macroblock.

10. The method of claim 9, further comprising:

retrieving a single neighborhood anchor macroblock from the frame store for an ensuing target macroblock in a following macroblock row of the current frame, wherein the ensuing target macroblock follows the next target macroblock, and wherein the following macroblock row follows the subsequent macroblock row;

searching the neighborhood anchor macroblocks for a best match to the ensuing target macroblock; and generating a vector indicative of the best match to the ensuing target macroblock.

11. The method of claim 9, further comprising:

retrieving neighborhood anchor macroblocks from the frame store for an ensuing target macroblock in the subsequent macroblock row of the current frame;

searching the neighborhood anchor macroblocks for a best match to the ensuing target macroblock; and generating a vector indicative of the best match to the ensuing target macroblock.

12. The method of claim 6, wherein the method further comprises compressing the target macroblocks using the generated vectors.

13. The method of claim 12, wherein the compressing comprises:

finding a difference between a target macroblock and a best match indicated by a corresponding vector;

performing a discrete cosine transform on the difference to obtain DCT coefficients;

quantizing the DCT coefficients to obtain quantized DCT coefficients; and encoding the DCT coefficients with a variable length code to obtain compressed macroblocks.

14. A video encoder which comprises:

a frame store configured to store anchor frames and configured to buffer a current frame for compression; and a motion compensation module coupled to the frame store and configured to retrieve target macroblocks from macroblock rows in the current frame, wherein after retrieving a target macroblock from a first macroblock row in the current frame the motion compensation module retrieves a target macroblock from an adjacent macroblock row in the current frame before retrieving a subsequent target macroblock from the first macroblock row, wherein for each retrieved target macroblock from the current frame, the motion compensation module is configured to search a corresponding neighborhood of macroblocks in an anchor frame to find a best matching macroblock and to generate a vector indicative of the best matching macroblock.

15. The video encoder of claim 14, wherein the motion compensation module includes a cache configured to cache macroblocks from more than one previous search neighborhood.

16. The video encoder of claim 14, wherein for each target macroblock from the adjacent macroblock row the motion compensation module retrieves only a single anchor macroblock from the frame store to complete the corresponding neighborhood of macroblocks from the anchor frame.

17. The video encoder of claim 14, further comprising a compression module coupled to the motion compensation module to receive the vector indicative of the best matching macroblock, and configured to find a difference between the target macroblock from the current frame and a corresponding best matching macroblock, wherein the compression module is configured to perform a discrete cosine transform on the difference to obtain DCT coefficients, wherein the compression module is configured to quantize the DCT coefficients to obtain quantized coefficients, and wherein the compression module is configured to reorder and encode the quantized coefficients to obtain a compressed macroblock.

18. The video encoder of claim 17, wherein the compression module is configured to provide compressed macroblocks from the first macroblock row in the current frame as a compressed video bitstream, and wherein the compression module is configured to buffer compressed macroblocks from the adjacent macroblock row in the current frame until the all compressed macroblocks from the first macroblock row in the current frame have been provided in the compressed video bitstream.

19. The video encoder of claim 14, further comprising a preprocessing module configured to receive a digital video signal in raster order and configured to convert the digital video signal into macroblocks, wherein the preprocessing module is coupled to the frame store to store the macroblocks.

* * * * *